US008118544B2

(12) United States Patent  (10) Patent No.: US 8,118,544 B2
Arnold  (45) Date of Patent: Feb. 21, 2012

(54) BEARING AND RETENTION MECHANISMS

(75) Inventor: Steven Don Arnold, Rancho Palos Verdes, CA (US)

(73) Assignee: Honeywell International Inc., Morristown, NJ (US)

( * ) Notice: Subject to any disclaimer, the term of this patent is extended or adjusted under 35 U.S.C. 154(b) by 550 days.

(21) Appl. No.: 12/350,029

(22) Filed: Jan. 7, 2009

(65) Prior Publication Data

US 2010/0172739 A1    Jul. 8, 2010

(51) Int. Cl.
*F01B 25/02* (2006.01)
*F01D 17/12* (2006.01)
*F03D 7/00* (2006.01)
*F04D 15/00* (2006.01)
*F04D 27/00* (2006.01)
*F04D 29/44* (2006.01)
*F04D 29/56* (2006.01)

(52) U.S. Cl. ........... 415/163; 415/156; 415/160; 60/602
(58) Field of Classification Search ........... 415/156, 415/160, 163, 164, 166; 60/602
See application file for complete search history.

(56) References Cited

U.S. PATENT DOCUMENTS

| | | | | |
|---|---|---|---|---|
| 4,679,984 A | * | 7/1987 | Swihart et al. | 415/163 |
| 4,726,744 A | * | 2/1988 | Arnold | 417/407 |
| 4,804,316 A | * | 2/1989 | Fleury | 417/407 |
| 5,653,419 A | * | 8/1997 | Uchisawa et al. | 251/58 |
| 6,269,642 B1 | * | 8/2001 | Arnold et al. | 60/602 |

FOREIGN PATENT DOCUMENTS

| | | |
|---|---|---|
| EP | 2351534 | 3/2001 |
| JP | 2001208077 | 8/2001 |
| JP | 2004052933 | 2/2004 |

* cited by examiner

*Primary Examiner* — David Nhu
(74) *Attorney, Agent, or Firm* — Brian J. Pangrle

(57) ABSTRACT

An exemplary locating mechanism includes a bearing outer race (422) that has a central axis (z-axis) and that has a turbine end, a compressor end and a slot (421), of an axial length, disposed between the turbine end and the compressor end; and a deformable clip (430) shaped as a semi-cylindrical wall having an axial length less than the axial length of the slot, where in a tension state, the clip (430) has an inner circumference to position the clip (430) with respect to the slot (421) and where in a compression state, the clip (430) has an inner circumference that locates the clip (430) in the slot (421). Various other exemplary technologies are also disclosed.

19 Claims, 8 Drawing Sheets

Exemplary Assembly 200

Exemplary Assembly 700

Exemplary Assembly 800

BEARING AND RETENTION MECHANISMS

TECHNICAL FIELD

Subject matter disclosed herein relates generally to bearing systems for turbomachinery such as turbochargers for internal combustion engines.

BACKGROUND

Turbomachines rely on turbines to convert fluid energy to mechanical energy. In most configurations, a turbine is connected to a shaft supported by one or more bearings where the shaft rotates along with the turbine as the turbine extracts energy from a fluid stream. For exhaust driven turbines, a shaft may rotate at over 100,000 rpm. Turbomachinery operating at such high rotational speeds generate a significant amount noise.

One type of turbomachinery noise stems lubrication instabilities known as "whirl". Another type of turbomachinery noise is associated with component clearances and commonly referred to as "rub" (e.g., component-to-component contact). While appropriate choices in lubricant, balancing, and component clearances can minimize noise, no turbomachine operates silently. As described herein, various exemplary arrangements, materials and techniques aim to reduce generation and transmission of turbomachinery noise, especially for turbochargers.

BRIEF DESCRIPTION OF THE DRAWINGS

A more complete understanding of the various arrangements, techniques, etc., described herein, and equivalents thereof, may be had by reference to the following detailed description when taken in conjunction with the accompanying drawings wherein.

DETAILED DESCRIPTION

Turning to the drawings, various methods are illustrated as being optionally implemented in a suitable control and/or computing environment, for example, in the general context of computer-executable instructions, such as program modules, being executed by a computer and/or other computing device (e.g., including robotic devices for use in manufacturing components or assemblies). Generally, program modules include instructions, routines, programs, objects, components, data structures, etc. One or more computer-readable media may be used to store such information. One or more machines may, at least in part, be programmed or otherwise instructed to perform part or all of various methods described herein.

In some diagrams herein, various algorithmic acts are summarized in individual "blocks". Such blocks describe specific actions or decisions that are made or carried out as a process proceeds. Where a controller (or equivalent) is employed, the flow charts presented herein provide a basis for a "control program" or software/firmware that may be used by such a controller (or equivalent) to control a device and/or a system. As such, various processes may be implemented as machine-readable instructions storable in memory that, when executed by a processor, perform various acts illustrated as blocks. In addition, various diagrams include individual "blocks" that are optionally structural elements of a device and/or a system. For example, a "controller block" optionally includes a controller as a structural element.

Those skilled in the art may readily write such a control program based on the flow charts and other descriptions presented herein. It is to be understood and appreciated that the subject matter described herein includes not only devices and/or systems when programmed to perform various acts described below, but the software that is configured to program the controllers and, additionally, any and all computer-readable media on which such software might be embodied. Examples of such computer-readable media include, without limitation, floppy disks, hard disks, CDs, RAM, ROM, flash memory and the like.

Figure 1:
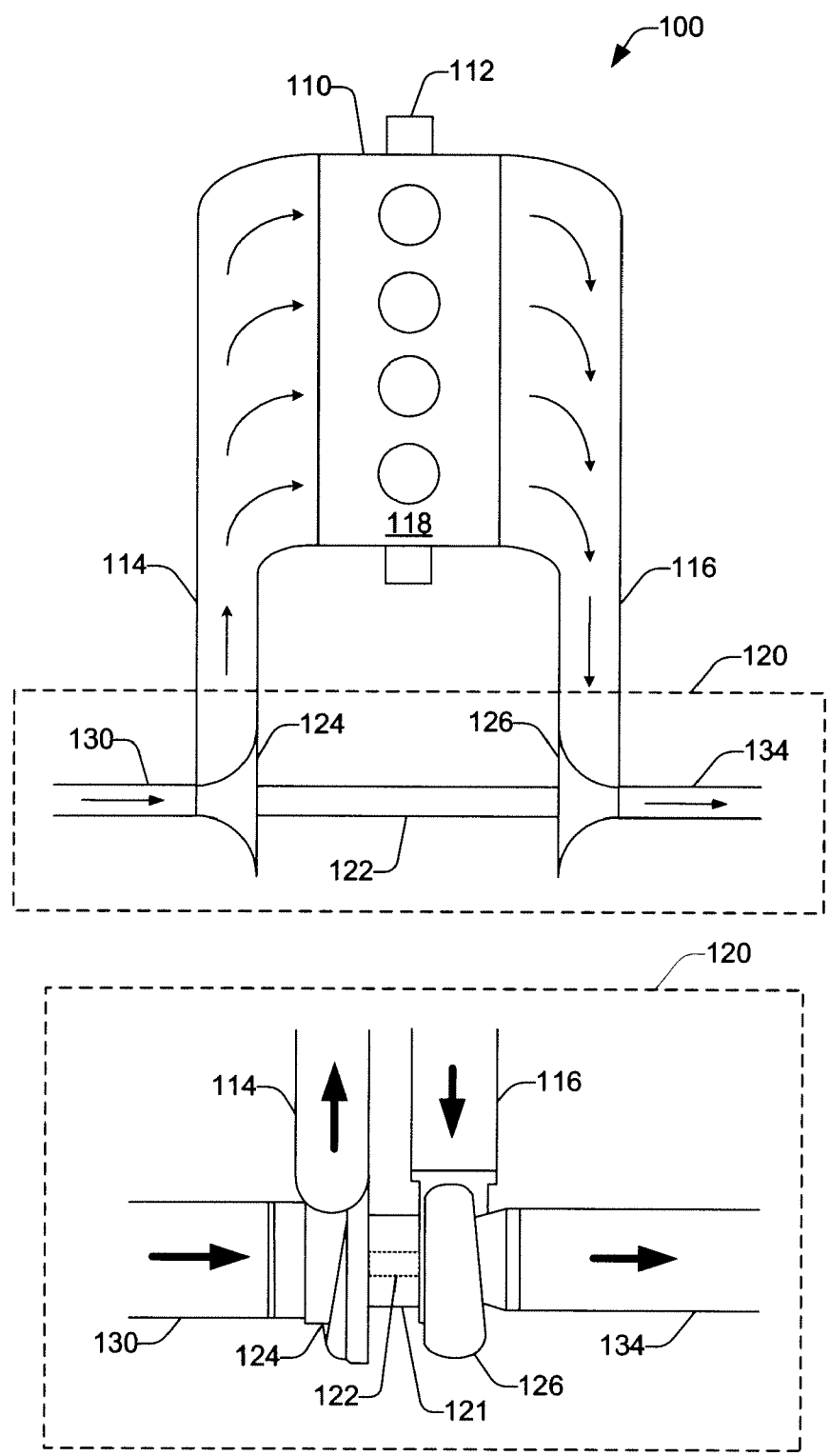
FIG. 1 is a simplified approximate diagram illustrating a prior art turbocharger system for an internal combustion engine.

Turbochargers are frequently utilized to increase the power output of an internal combustion engine. Referring to FIG. 1, a prior art power system 100 includes an internal combustion engine 110 and a turbocharger 120. The internal combustion engine 110 includes an engine block 118 housing one or more combustion chambers that operatively drive a shaft 112. An intake port 114 provides a flow path for compressed intake air to the engine block while an exhaust port 116 provides a flow path for exhaust from the engine block 118. The turbocharger 120 acts to extract energy from the exhaust and to provide energy to the intake air.

As shown in FIG. 1, the turbocharger 120 includes an air inlet 130, a shaft 122, a compressor stage 124, a turbine stage 126 and an exhaust outlet 134. The turbine stage 126 optionally includes a variable geometry unit and a variable geometry controller. The variable geometry unit and variable geometry controller optionally include features such as those associated with commercially available variable geometry turbochargers (VGTs). Commercially available VGTs include, for example, the GARRETT® VNT™ and AVNT™ turbochargers, which use multiple adjustable vanes to control the flow of exhaust across a turbine. A description of a variable geometry turbocharger appears in U.S. Pat. No. 6,269,642, to Arnold et al., which is incorporated by reference herein. An exemplary turbocharger may employ wastegate technology as an alternative or in addition to variable geometry technology. The compressor stage 124 optionally includes features to control the flow of intake air (e.g., variable geometry compressor).

Figure 2:
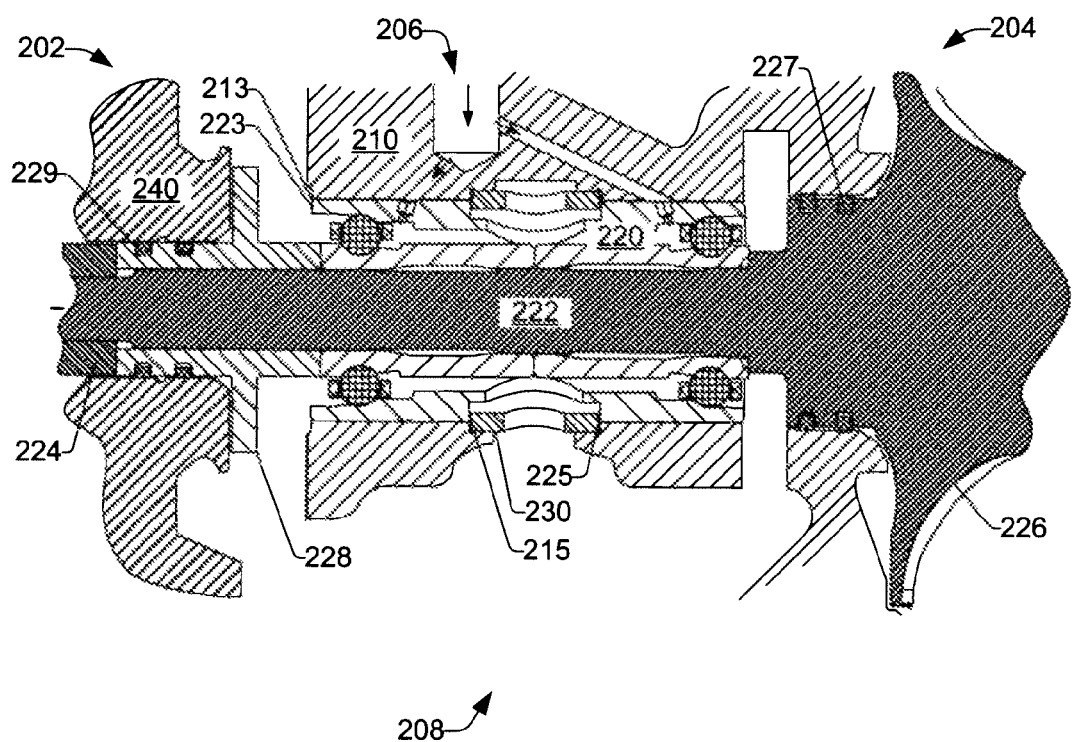
FIG. 2 is cross-sectional view of an assembly with an exemplary bearing system suitable for use with the internal combustion engine of FIG. 1.

In general, the turbine stage 126 includes a turbine wheel (see, e.g., wheel 226 of FIG. 2) housed in a turbine housing and the compressor stage 124 includes a compressor wheel (see, e.g., wheel 224 of FIG. 2) housed in a compressor housing where the turbine housing and compressor housing connect directly or indirectly to a center housing 121 (see also housing 210 of FIG. 2). The center housing 121 typically houses one or more bearings that rotatably support the shaft 122, which is optionally a multi-component shaft.

During operation, a turbocharger generates noise where the overall "sound quality" may be determined by its noise, vibration and harshness (NVH) characteristics. Conventional ball bearing systems have noted NVH issues. NVH issues can be attributed to factors such as inner race eccentricity, tolerances, balance, centering and assembly. Any of these factors can result in metal-to-metal contact between components (e.g., between a bearing and a housing). While lubricant films can damp some detrimental NVH energy, metal pin or end plate locating mechanisms readily transmit NVH energy. Complex loading can also generate axial vibration, which is often poorly damped.

FIG. 2 shows a turbocharger assembly 200 that includes an exemplary locating mechanism that relies on a clip 230. Specifically, in the example of FIG. 2, the clip 230 locates a bearing cartridge 220 in a housing 210. Locating is achieved by seating the clip 230 in a slot 225 in an outer race 223 of the bearing cartridge 220 and a slot 215 in a bore 213 of the housing 210.

Other components or features of the assembly 200 of FIG. 2 include a compressor end 202, a turbine end 204 and a lubricant inlet 206 and a lubricant outlet 208 for the housing 210. As mentioned, the housing 210 includes a bore 213 configured to receive the bearing cartridge 220. The bearing cartridge 220 rotatably supports a shaft 222. FIG. 2 shows a portion of a compressor wheel 224 and a portion of a turbine wheel 226 attached to the shaft 222. The shaft 222 may be a single piece shaft or a multi-component shaft. In some instances, the shaft 222 may be integral with the turbine wheel 226 (.

The turbine wheel 226 includes a seal mechanism 227 that acts to seal lubricant on a housing side and exhaust on an exhaust side of the assembly 200. In the example of FIG. 2, the seal mechanism 227 relies on two seal rings set in grooves of the turbine wheel 226. The housing 210 may include one or more features that form part of or cooperate with the seal mechanism 227.

The compressor wheel 224 connects to the shaft 222 and is spaced axially from the bearing cartridge 220 by a collar 228 (e.g., a thrust collar). The collar 228 includes a seal mechanism 229 that acts to seal lubricant on a housing side and intake air on an intake side of the assembly 200. In the example of FIG. 2, the seal mechanism 229 relies on two seal rings set in grooves of the collar 228. A compressor plate 240 may include one or more features that form part of or cooperate with the seal mechanism 229. The compressor plate 240 typically connects to the housing 210 (e.g., via one or more bolts, etc.).

As indicated by arrows, the assembly 200 is configured to receive lubricant at an inlet 206. Lubricant can then flow to the bore 213 and the bearing cartridge 220 via one or more lubricant paths. Lubricant can flow axially toward the compressor end 202 and the turbine end 204 and exit the housing 210 via the lubricant outlet 208 (see FIG. 7 for a detailed view of a lubricant outlet).

During operation of the assembly 200, changes in conditions can cause the shaft 222 to exert axial forces (e.g., axial thrust). To maintain the bearing cartridge 220 in the bore 213, the clip 230 bridges the housing 210 and the outer race of the bearing 220. In addition, the clip 230 includes openings that allow lubricant to flow to, or from, the bearing cartridge 220 and the housing 210. For example, as shown in FIG. 2, an opening at the bottom side of the clip 230 allows lubricant to flow from the space between the inner and outer races of the bearing cartridge 220 toward the opening 208.

Figure 3:
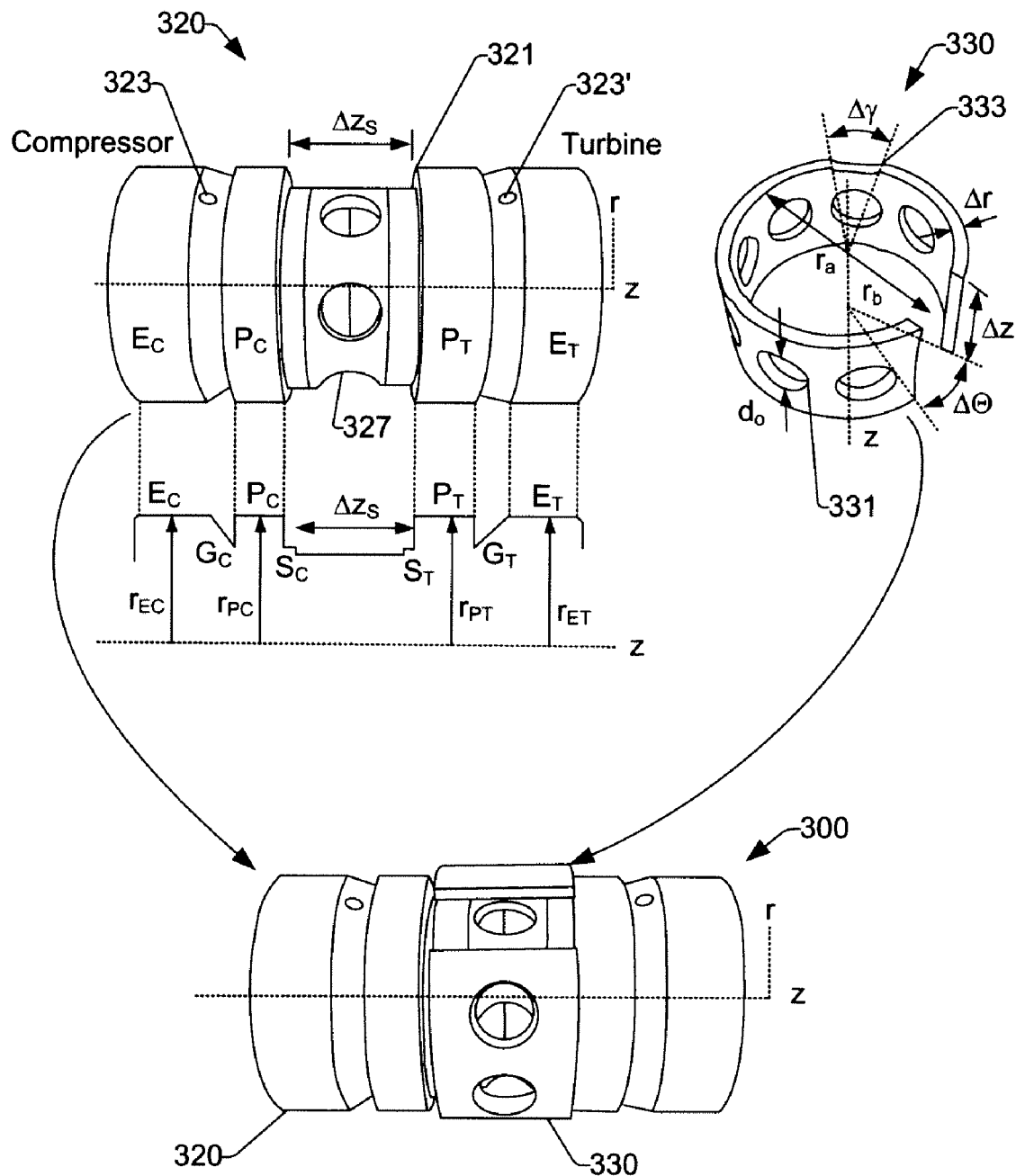
FIG. 3 is a series of views of a bearing cartridge and an associated clip.

FIG. 3 shows an exemplary bearing cartridge 320 and clip 330 that form an assembly 300, for example, suitable for use with the housing 210 of turbocharger assembly 200 of FIG. 2 (e.g., as the bearing cartridge 220 and the clip 230). As mentioned, an exemplary locating mechanism includes a bearing cartridge with a slotted outer race that can seat a clip. In the example of FIG. 3, the bearing cartridge 320 includes an outer race slot 321 having an axial length $\Delta z_S$, along a z-axis, disposed between a compressor end and a turbine end.

A profile of the bearing cartridge 320 illustrates the slot 321 with respect to grooves, plateaus and surfaces with respect to the z-axis (e.g., axis of rotation). From the compressor end to the turbine end, the profile includes a cylindrical surface ($E_C$) disposed at a radius $r_{EC}$ adjacent the compressor end, a groove ($G_C$) adjacent the surface $E_C$, a plateau ($P_C$) disposed at a radius $r_{PC}$ adjacent the groove $G_C$, a slot wall ($S_C$) adjacent the plateau $P_C$, a slot (length $\Delta z_S$), a slot wall ($S_T$) defining in part the length of the slot ($\Delta z_S$), a plateau ($P_T$) disposed at a radius $r_{PT}$ adjacent the slot wall $S_T$, and a cylindrical surface ($E_T$) disposed at a radius $r_{ET}$ adjacent the turbine end.

The bearing cartridge 320 also includes a lubricant opening 323 positioned in the groove $G_C$ and a lubricant opening 323' positioned in the groove $G_T$. The lubricant openings 323, 323' allow lubricant to flow to the inner portion of the bearing cartridge 320 (e.g., to lubricate balls, one or more journals, etc.). The bearing cartridge 320 further includes a series of openings 327 in a cylindrical wall disposed between the slot walls $S_C$ and $S_T$ that allow lubricant to flow to, or from, the inner portion of the bearing cartridge 320.

The clip 330 includes various features as illustrated in a perspective view. These features are described with respect to a cylindrical coordinate system that includes an axial dimension z, a radial dimension r and an azimuthal dimension θ. The clip 330 is generally shaped as a cylindrical wall (with a length or height $\Delta z$, approximately $\Delta z_S$) with a slit and made of a material capable of being deformed to change its overall circumference or maximal radial dimension. The material may be selected to reduce transmission of noise or vibration from the bearing cartridge 330 and a housing (e.g., the housing 210 of FIG. 2). For example, various non-metallic materials have properties that differ from metals and that act to reduce transmission or generation of noise when compared to metals. The polyimide resin VESPEL® (marketed by E.I. du Pont de Nemours and Company, Wilmington, Del.) can withstand continuous operational temperatures of 260° C. with excursions to 482° C. (VESPEL® SP1 density~1.4 g/cm³). Various resins may include metals, usually in ionic form, and be considered composite materials suitable for constructing the clip 330 of FIG. 3.

In the example of FIG. 3, the clip 330 has a radial dimension ($r_b$) that exceeds that of the plateau surfaces $P_C$ ($r_{PC}$) and $P_T$ ($r_{PT}$) of the bearing cartridge 320 such that, when positioned in a bore of a housing, the clip 330 extends beyond the adjacent plateau surfaces $P_C$ and $P_T$ of the bearing cartridge 320 to locate the bearing cartridge 320 in the housing.

In the example of FIG. 3, the clip 330 includes a slit opening in a relaxed state defined by an angle $\Delta\theta$. Upon tension, the angle $\Delta\theta$ is increased, which can assist in assembly of the assembly 300. Upon compression, the angle $\Delta\theta$ is decreased, as is the maximum radial dimension of the clip 330, which can assist in positioning the assembly 300 in or removing the assembly 300 from a bore (e.g., the bore 213 of the housing 210 of FIG. 2). A radial dimension ($r_a$) is typically the smallest radial dimension of the clip 330 and may correspond to the radial dimension achieved upon compression of the clip 330 to eliminate the slit opening (e.g., $\Delta\theta \sim 0$).

In the example of FIG. 3, the clip 330 includes openings 331 having a dimension $d_o$ (e.g., a diameter). The clip 330 has a radial thickness or width $\Delta r$, which corresponds to the radial dimension of the openings 331. The radial thickness $\Delta r$, while shown as being constant, may vary. The clip 330 also includes notches 333, which span an angle $\Delta\gamma$. In FIG. 3, two notches are shown on one end surface of the clip 330 noting that the clip 330 may have such notches on the other end surface as well.

The assembly 300 shows the clip 330 positioned with respect to the slot 321 of the bearing cartridge 320. The clip 330 may be provided in a state that allows it to be positioned with respect to the slot 321 (e.g., an inner radius larger than the maximum outer radius of the bearing cartridge 320. Once positioned, the clip 330 may be compressed such that the clip 330 seats in the slot 321 (e.g., restrained in part by the walls $S_C$ and $S_T$ that define the slot 321). For insertion into a bore of a housing, the clip 330 may be further compressed to a dimension (e.g., diameter) smaller than that of the bore.

As described herein, an exemplary locating mechanism includes a unitary bearing outer race that has a central axis and that includes a turbine end, a compressor end and a slot, of an axial length, disposed between the turbine end and the compressor end; and a deformable clip shaped as a semi-cylindrical wall having an axial length less than the axial length of the slot, where, in a tension state, the clip has an inner circumference to position the clip with respect to the slot and where, in a compression state, the clip has an inner circumference that locates the clip in the slot. For example, in FIG. 3, the clip 330 has an inner circumference that changes with respect to a change in the angle $\Delta\Theta$. As this angle increases, the inner circumference increases to a sufficient extent to allow the clip 330 to be positioned with respect to the slot 321 of the bearing 320.

After positioning, as the angle $\Delta\Theta$ decreases, the inner circumference of the clip 330 decreases to locate the clip 330 in the slot 321. After locating the clip 330 with respect to the slot 321, the clip 330 may be compressed again to decrease the angle $\Delta\Theta$ for positioning the bearing 320 and clip 330 into a bore of a housing. The clip 330 may be resilient and expand in a slot in the bore of the housing or, as explained below, an adjustment may be made to the clip 330 to increase its outer dimension (e.g., circumference or diameter) to locate it with respect to a slot in the bore of the housing. Hence, upon positioning the clip 330 in a bore of a housing, the clip 330 can have an outer circumference that locates the clip 330 in a slot of the bore of the housing.

As described herein, an exemplary method may perform the aforementioned acts to increase and decrease the inner circumference of the clip 330 with respect to the bearing 320. Such acts may be performed by machinery (e.g., robotic machinery) controlled by a computing device per processor executable instructions.

Figure 4:
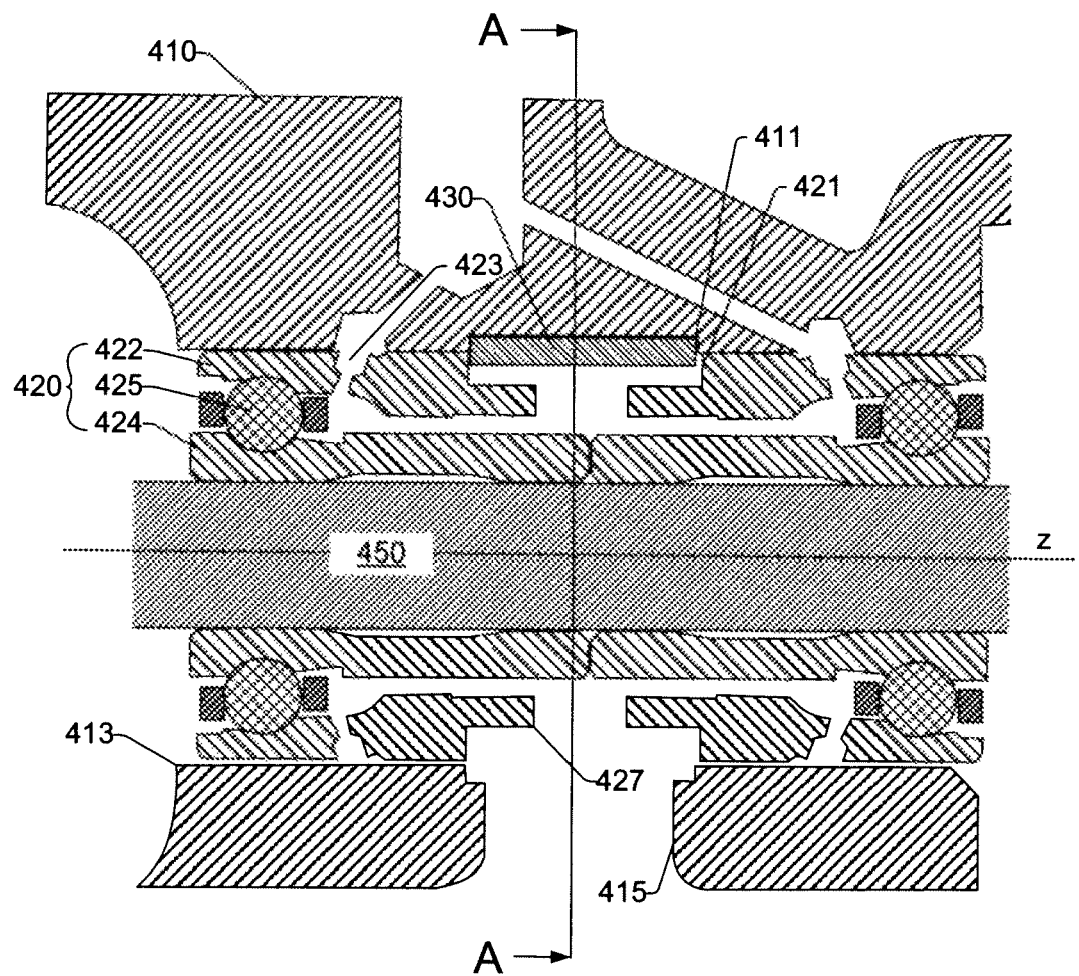
FIG. 4 is a cross-sectional view of an assembly that includes a locating clip to locate a bearing cartridge in a bore.

FIG. 4 shows a cross-sectional view of an exemplary assembly 400 that includes a clip 430 that locates a bearing cartridge 420 in a bore 413 of a housing 410. The bearing cartridge 420 includes an outer race 422, balls 425 and an inner race 424 that receives a shaft 450 (e.g., via a compression fit). As indicated, the clip 430 bridges a slot 411 in the bore 413 and a slot 421 in the outer race 422. In the example of FIG. 4, the inner race 424 is composed of two pieces while the outer race 422 is unitary. In the cross-sectional view of FIG. 4, the outer race 422 appears as eight segments, however, as for the bearing cartridge 320 of FIG. 3, the outer race 422 is a unitary outer race with lubricant openings 423 and 427. Also, in the cross-sectional view of FIG. 4, the clip 430 has its slit positioned at the lower portion of the outer race 422.

Further, the housing 410 includes a lubricant opening 415 that provides access to the clip 430.

Figure 7:
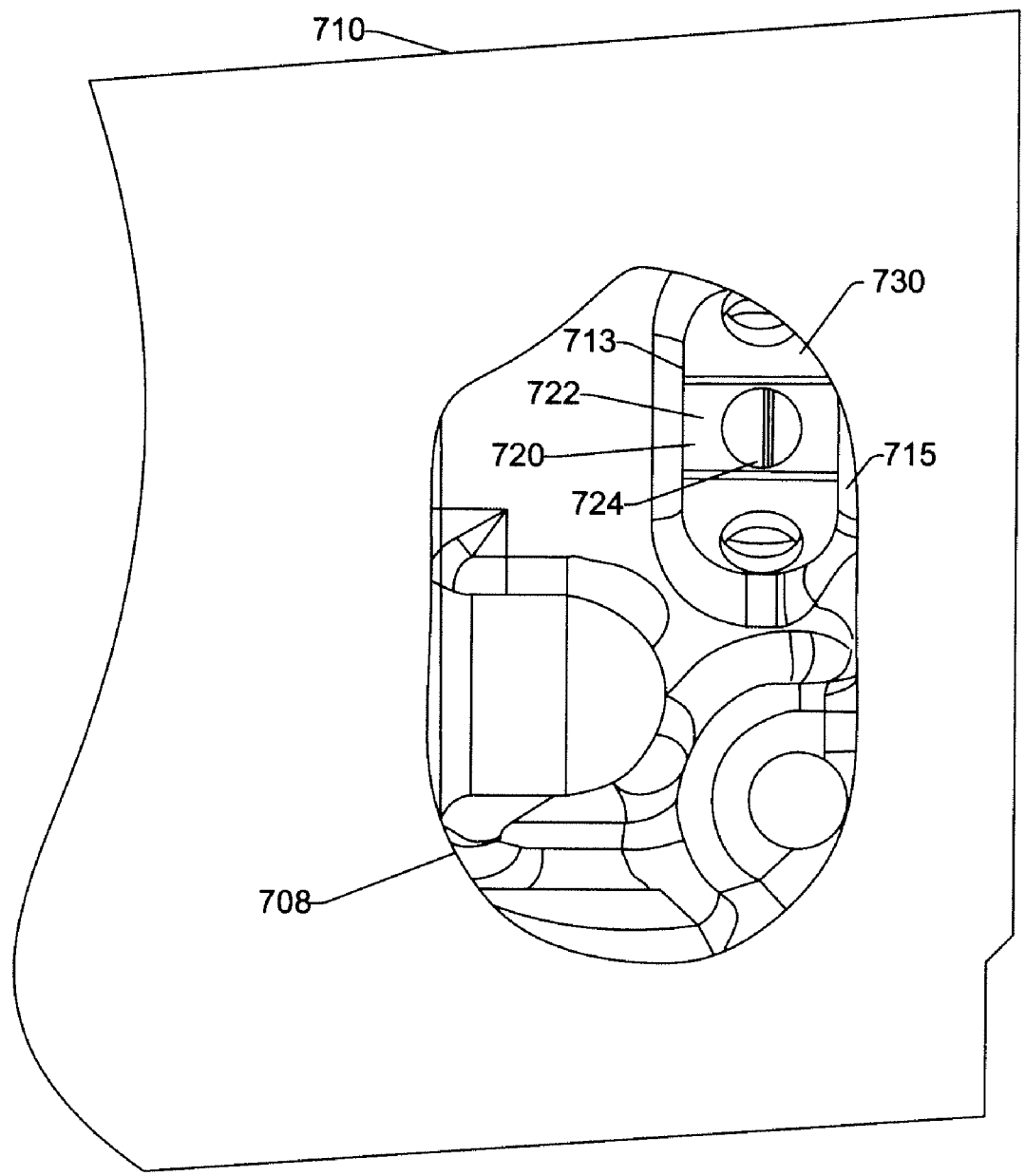
FIG. 7 is a view of an assembly via a lubricant opening of a housing.

As described herein, an exemplary assembly includes a housing that includes a bore that has a slot; a bearing cartridge that includes an outer race that has a slot, an inner race and balls disposed between the outer race and the inner race; and a clip seated partially in the bore slot and partially in the outer race slot to retain the bearing cartridge in the bore of the housing. In this example, the clip can have a semi-cylindrical wall and optionally one or more lubricant openings. The clip may be made of a resin, which can act to reduce transmission of noise or vibration when compared to a metal clip. As indicated in FIG. 4, a housing can include a lubricant opening that provides access to a clip (e.g., an opening in the portion of the housing that defines a bore). Another lubricant opening is shown in FIG. 7, which allows for access to an opening in the bore. In such a manner, a lubricant opening or openings can provide access to a clip to allow for deformation of the clip to increase or to decrease an outer diameter of the clip.

Figure 5:
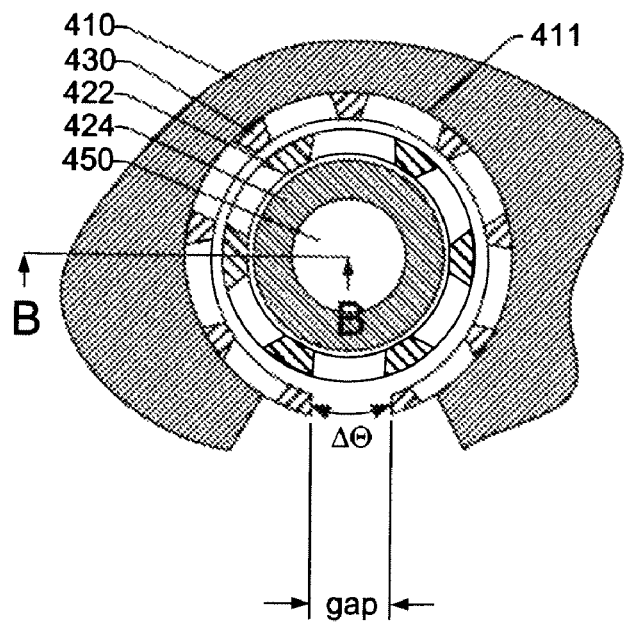
FIG. 5 is a cross-sectional view of the assembly of FIG. 4 along the line A-A.

FIG. 5 shows a cross-sectional view of the assembly 400 of FIG. 4 along a line A-A. In this view, the housing 410, the clip 430, the outer race 422, the inner race 424 and the shaft 450 are visible. This view also shows the slit defined by an angle $\Delta\Theta$ and a gap width as well as the semi-annular slot 411 of the housing 410.

Figure 6:
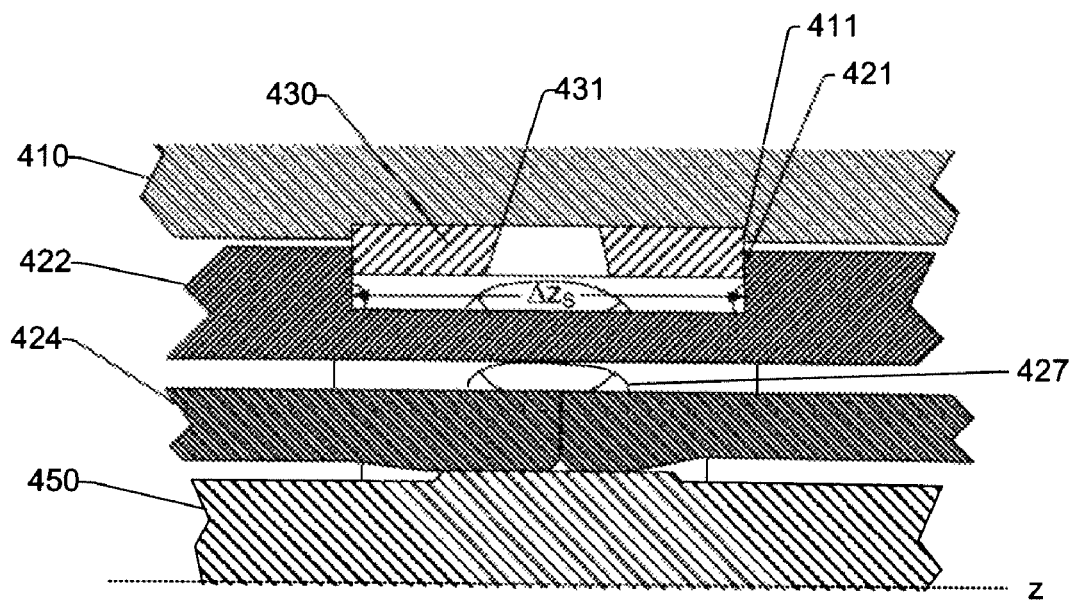
FIG. 6 is a cross-sectional view of the assembly of FIG. 5 along the line B-B.

FIG. 6 shows a cross-sectional view of the assembly 400 of FIG. 4 along a line B-B as indicated in FIG. 5. In this view, the housing 410, the clip 430, the outer race 422, the inner race 424 and the shaft 450 are visible. This view also shows lubricant openings 431 in the clip 430 and lubricant openings 427 in the outer race 422.

FIG. 7 shows a view of an assembly 700 that includes a clip 730 positioned to locate a bearing cartridge 720 in a bore 713 of a housing 710. This view is from a lower side of the housing 710 via a lubricant opening 708 (e.g., a lubricant drain) and exposes a lubricant opening 715 of the bore 713 of the housing 710, an outer race 722 and an inner race 724 of the bearing cartridge 720 and the clip 730. In this example, the clip 730 is accessible via the lubricant opening 708. By access, a technician may adjust the clip 730 with respect to the housing 710 or the outer race 722 of the bearing cartridge 720. Upon insertion of the bearing cartridge 720 and clip 730 into the bore 713 of the housing 710, as an assembly, a technician may adjust the clip 730 to ensure proper seating in a slot of the housing 710 (see, e.g., FIGS. 2, 4, 5 and 6). Upon removal of the bearing cartridge 720 from the bore 713 of the housing 710, a technician may adjust the clip 730 to decrease its outer dimension (e.g., diameter) to be less than the diameter of the bore 713. In instances where the slit of the clip 730 is not in the position shown in FIG. 7, a technician may adjust the clip 730 to more readily allow for compression or tension of the clip 730 in the bore 713 of the housing 710. Regardless of the position of the clip 730 in the slot of the outer race 722, lubricant can flow to and from the space between the outer race 722 and the inner race 724 of the bearing cartridge 720.

Figure 8:
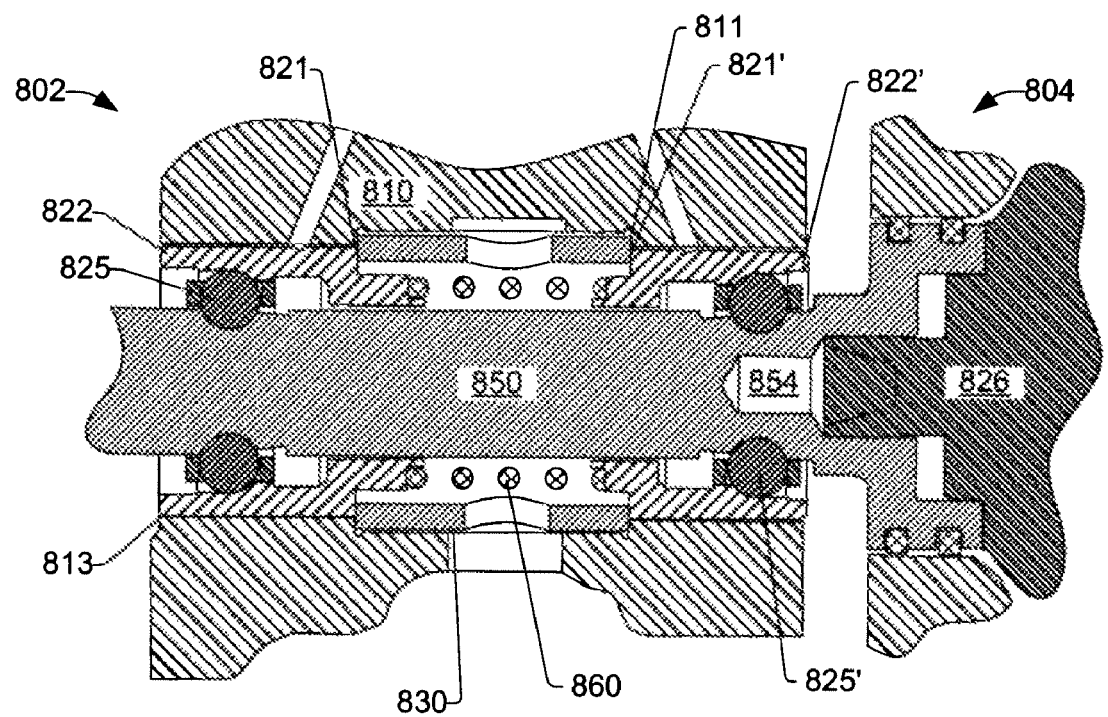
FIG. 8 is a cross-sectional view of an assembly that includes two outer races spaced by a clip and a spring.

FIG. 8 shows an assembly 800 with an exemplary locating mechanism that includes a clip 830 and a spring 860 to locate a compressor end 802 bearing outer race 822 and a turbine end 804 bearing outer race 822' in a bore 813 of a housing 810. The clip 830 spaces the outer races 822, 822' at a shoulder 821 of the outer race 822 and a shoulder 821' of the outer race 822'. The clip 830 bridges the shoulders 821, 821' and a slot 811 in the bore 813 of the housing 810. Further, in the example of FIG. 8, the shaft 850 acts as an inner race and includes a socket 854 to receive a turbine wheel 826 (the shaft 850 can include an extension or socket for attachment of a compressor wheel, e.g., see FIG. 2). A compressor end 802 ball set 825 and a turbine end 804 ball set 825' allow for rotation of the shaft 850 with respect to the outer races 822, 822'.

In the example of FIG. 8, the shaft 850 acts as an inner race that cooperates with the two outer races 822, 822'. The spring 860 may be pre-loaded and configured to handle thrust loads (e.g., absorb thrust forces to reduce noise). The clip 830 may be formed, at least in part, from a non-metallic material such as a resin. In turn, such a material can have properties that reduce transmission of noise.

In the arrangement of FIG. 8, thrust loads can be carried and transferred by the clip 830. The clip 830 may protect the spring 860 from experiencing some thrust loads, for example, when the spacing between the two outer races 822, 822' is defined by an axial dimension of the clip 830. As mentioned, a pre-loaded spring may work cooperatively with the clip 830 to absorb thrust loads and reduce noise.

As shown in FIG. 8, the shaft 850 may receive a pressed-on finished turbine wheel 826 via the socket 854. The socket 854 of the shaft 850 can include an anti-thermal ratcheting feature or features. For example, the socket 854 can include an additional diameter near a transition to a smaller gas expansion cavity that accepts a raised lip of a turbine wheel. In this example, the turbine wheel lip, within the diameter of the socket 854, locks in place and provides an anti-thermal ratcheting feature between the turbine wheel and the shaft 850. This feature also provides an axial load between the turbine wheel and the shaft 850.

The assembly 800 of FIG. 8 acts to eliminate inner race concentricity issues and can provide for beneficial NVH characteristics. The arrangement of FIG. 8 can also allow for a reduction in diameter of the bearing when compared to alternative arrangements that include a shaft and a separate inner race. The arrangement of FIG. 8 can also result in a lower dN value, which can increase lifetime. The shaft/inner race configuration of FIG. 8 eliminates a need for machining a hole and precision finishing a separate inner race(s) as well as a need to precision fit a shaft to an inner race(s). Where the arrangement allows for smaller diameter components, a material reduction results. Further, depending on density, a reduction in mass can be achieved.

As described herein, an exemplary assembly includes an integral ball bearing (inner ball races on shaft) and a retaining clip to space two corresponding outer ball races. In a particular example, an 8 mm bearing can be used with a Garrett® turbocharger having GT32 (e.g., compressor wheel diameter ~71 mm and turbine wheel diameter ~64 mm) or GT35 (e.g., compressor wheel diameter ~71 mm and turbine wheel diameter ~68 mm) frame sizes. The integral bearing can be a full complement cageless design with a spring system to load balls against ramps. In this assembly, the retaining clip can transmit axial thrust from the two piece outer bearing race to the center housing.

As described herein, an exemplary locating mechanism includes a first bearing outer race that includes a first shoulder; a second bearing outer race that includes a second shoulder; a deformable clip shaped as a semi-cylindrical wall having an axial length that defines a spacing between the first shoulder and the second shoulder; a spring to bias the first bearing outer race with respect to the second bearing outer race; and a shaft, inner race that cooperates with the first bearing outer race and the second bearing outer race and that can include an attachment mechanism for a turbine wheel at one end and an attachment mechanism for a compressor wheel at an opposing end. In such an example, the deformable clip may be made of resin.

As described herein, an exemplary assembly includes a housing that includes a bore that has a slot; a first bearing outer race that includes a first shoulder; a second bearing outer race that includes a second shoulder; a deformable clip shaped as a semi-cylindrical wall having an axial length that defines a spacing between the first shoulder and the second shoulder, that seats at least partially in the slot of the bore, that restricts at least some axial movement the first bearing outer race in the bore and that restricts at least some axial movement the second bearing outer race in the bore; a spring to bias the first bearing outer race with respect to the second bearing outer race; and a shaft, inner race that cooperates with the first bearing outer race and the second bearing outer race and that can include an attachment mechanism for a turbine wheel at one end and optionally an attachment mechanism for a compressor wheel at an opposing end.

Figure 9:
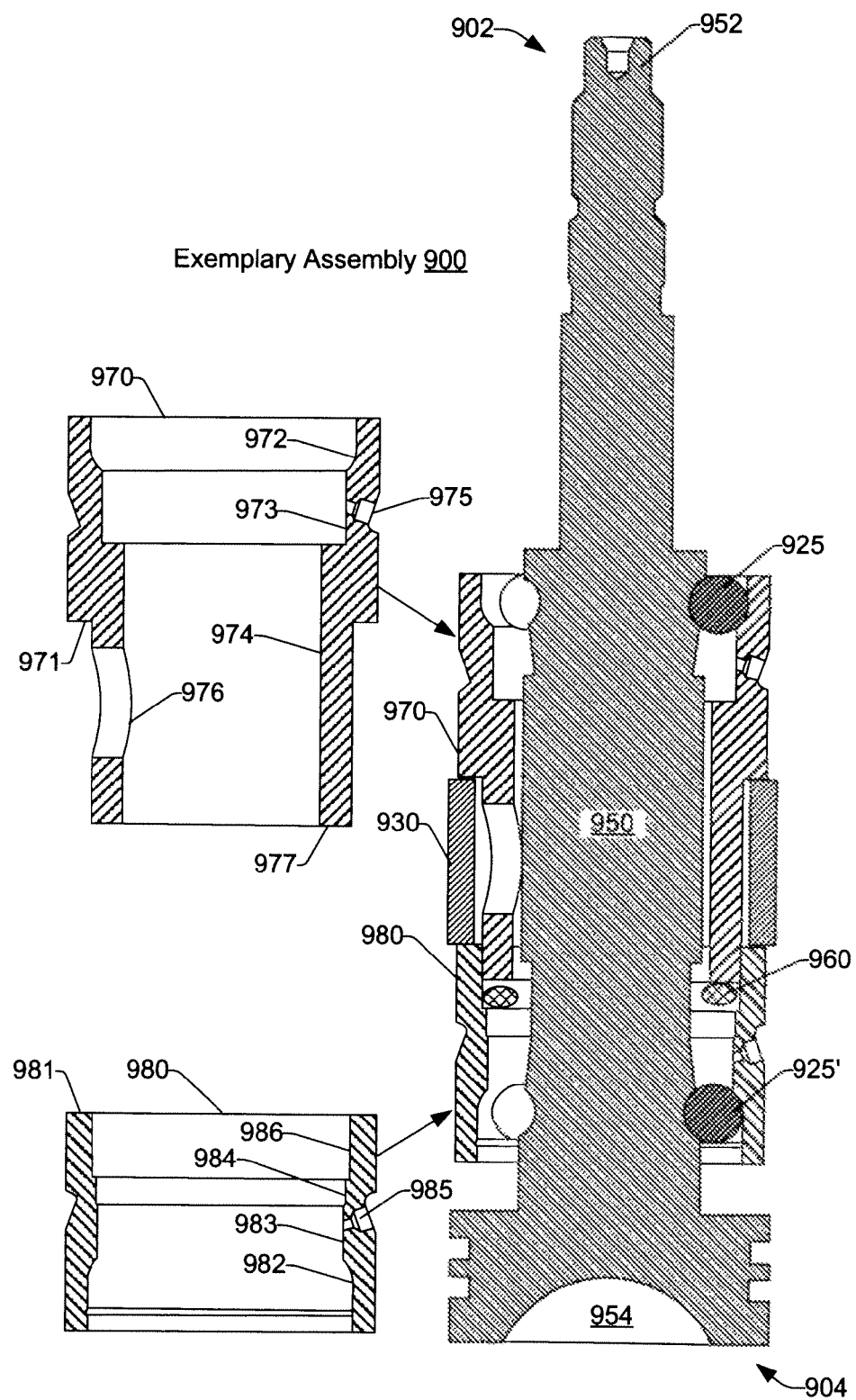
FIG. 9 is a cross-sectional view of an assembly that includes two outer races and a shaft that acts as an inner race.

FIG. 9 shows a cross-sectional view of an exemplary bearing assembly 900 that includes a shaft, inner race 950. The assembly 900 includes two outer races 970, 980 that cooperate to form a gap between a shoulder 971 of the outer race 970 and an end 981 of the outer race 980. A clip 930 may be used to maintain the gap between the two outer races 970, 980. The shaft 950 extends from a compressor end 902 to a turbine end 904 and includes features 952 for attachment of a compressor wheel and features 954 for attachment of a turbine wheel.

The outer race 970 further includes a race surface 972 that cooperates with balls 925, an adjacent surface 973 that can receive lubricant via an opening 975 in the cylindrical wall of the outer race 970, a surface 974 that includes an opening 976 for lubricant flow to or from the space between the outer race 970 and the shaft 950.

The outer race 980 further includes a race surface 982 that cooperates with balls 925', an adjacent surface 983 that can receive lubricant via an opening 985 in the cylindrical wall of the outer race 980, a step to a surface 984 and a step to a surface 986 that extends to the end surface 981, which, upon assembly, forms a gap with the surface 971 of the outer race 970.

As assembled, the outer race 980 receives a portion of the outer race 970 along the surface 986. A spring 960 may be positioned with respect to the outer race 970 and the outer race 980 to help maintain spacing, to absorb axial loads, etc. For example, a spring may be positioned with respect to the step between the surface 984 and the surface 986 of the outer race 980 to bias the outer race 970 (e.g., at an end surface 977).

As described herein, an exemplary assembly includes a first bearing outer race that includes a shoulder; a second bearing outer race that includes an end surface; a deformable clip shaped as a semi-cylindrical wall having an axial length that defines a spacing between the shoulder and the end surface; a spring to bias the first bearing outer race with respect to the second bearing outer race; and a shaft, inner race that cooperates with the first bearing outer race and the second bearing outer race via balls or other mechanism to allow for rotation of the shaft, inner race. In this example, the clip may be made of a resin. In this example, the clip and the spring can act cooperatively to absorb axial thrust forces exerted by the shaft, inner race and thereby reduce noise of the assembly during operation.

Although exemplary methods, devices, systems, etc., have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A locating mechanism comprising:
a bearing outer race (422) that has a central axis (z-axis) and that comprises a turbine end, a compressor end and a slot (421), of an axial length, disposed between the turbine end and the compressor end; and
a deformable clip (430) shaped as a semi-cylindrical wall having an axial length less than the axial length of the slot,
wherein in a tension state, the deformable clip (430) comprises an inner circumference to position the deformable clip (430) with respect to the slot (421) of the bearing outer race (422),
wherein in a compression state, the deformable clip (430) comprises an inner circumference that locates the deformable clip (430) in the slot (421) of the bearing outer race (422), and
wherein upon positioning the deformable clip (430) in a bore (413) of a housing (410), the deformable clip (430) comprises an outer circumference that locates the deformable clip (430) in a slot (411) of the bore (413) of the housing (410).

2. The locating mechanism of claim 1 wherein the bearing outer race comprises a unitary outer race (422).

3. The locating mechanism of claim 1 wherein the bearing outer race (422) comprises lubricant openings (423, 427).

4. The locating mechanism of claim 1 wherein the bearing outer race (422) comprises one or more lubricant openings (427) positioned along the axial length of the slot.

5. The locating mechanism of claim 1 wherein the deformable clip (430) comprises one or more lubricant openings (431).

6. The locating mechanism of claim 1 wherein the deformable clip (430) comprises a resin.

7. An assembly (400) comprising:
a housing (410) that comprises a bore (413) that comprises a slot (411);
a bearing cartridge (420) that comprises an outer race (422) that comprises a slot (421), an inner race (424) and balls (425) disposed between the outer race (422) and the inner race (424); and
a deformable clip (430) seated partially in the slot (411) and partially in the slot (421) to thereby retain the bearing cartridge (420) in the bore (413) of the housing (410).

8. The assembly of claim 7 wherein the deformable clip (430) comprises a semi-cylindrical wall.

9. The assembly of claim 7 wherein the deformable clip (430) comprises one or more lubricant openings (431).

10. The assembly of claim 7 wherein the deformable clip (430) comprises a resin.

11. The assembly of claim 7 wherein the housing (410) comprises a lubricant opening (415) that provides access to the deformable clip (430).

12. The assembly of claim 11 wherein the lubricant opening (415) provides access to the deformable clip (430) to allow for deformation of the deformable clip (430) to increase or to decrease an outer diameter of the deformable clip (430).

13. The locating mechanism of claim 12 wherein the deformable clip (830) comprises a resin.

14. A locating mechanism comprising:
a first bearing outer race (822) that comprises a first shoulder (821);
a second bearing outer race (822') that comprises a second shoulder (821');
a deformable clip (830) shaped as a semi-cylindrical wall having an axial length that defines a spacing between the first shoulder (821) and the second shoulder (821');
a spring (860) to bias the first bearing outer race (822) with respect to the second bearing outer race (822'); and
a shaft, inner race (850) that cooperates with the first bearing outer race (822) and the second bearing outer race (822') and that comprises an attachment mechanism (854) for a turbine wheel.

15. An assembly (800) comprising:
a housing (810) that comprises a bore (813) that comprises a slot (811);
a first bearing outer race (822) that comprises a first shoulder (821);
a second bearing outer race (822') that comprises a second shoulder (821');
a deformable clip (830) shaped as a semi-cylindrical wall having an axial length that defines a spacing between the first shoulder (821) and the second shoulder (821'), that seats at least partially in the slot (811), that restricts at least some axial movement the first bearing outer race (822) in the bore (813) and that restricts at least some axial movement the second bearing outer race (822') in the bore (813);
a spring (860) to bias the first bearing outer race (822) with respect to the second bearing outer race (822'); and
a shaft, inner race (850) that cooperates with the first bearing outer race (822) and the second bearing outer race (822') and that comprises an attachment mechanism (854) for a turbine wheel.

16. An assembly (900) comprising:
a first bearing outer race (970) that comprises a shoulder (971);
a second bearing outer race (980) that comprises an end surface (981);
a deformable clip (930) shaped as a semi-cylindrical wall having an axial length that defines a spacing between the shoulder (971) and the end surface (981);
a spring (960) to bias the first bearing outer race (970) with respect to the second bearing outer race (980); and
a shaft, inner race (950) that cooperates with the first bearing outer race (970) and the second bearing outer race (980) and that comprises an attachment mechanism (954) for a turbine wheel.

17. The assembly (900) of claim 16 wherein the deformable clip (930) comprises a resin.

18. The assembly (900) of claim 16 wherein the spring (960) biases an end surface (977) of the first bearing outer race (970) and an inner surface of the second bearing outer race (980).

19. The assembly (900) of claim 16 wherein the deformable clip (930) and the spring (960) act cooperatively to absorb axial thrust forces exerted by the shaft, inner race (950) and thereby reduce noise of the assembly (900) during operation.

* * * * *